(12) United States Patent
De La Rosa

(10) Patent No.: US 8,236,366 B2
(45) Date of Patent: Aug. 7, 2012

(54) FLAVORFUL WATERLESS COFFEE

(76) Inventor: Pablito Arriola De La Rosa, San Diego, CA (US)

( * ) Notice: Subject to any disclaimer, the term of this patent is extended or adjusted under 35 U.S.C. 154(b) by 63 days.

(21) Appl. No.: 12/799,803

(22) Filed: May 3, 2010

(65) Prior Publication Data

US 2011/0268863 A1 Nov. 3, 2011

(51) Int. Cl.
*A23F 5/00* (2006.01)
(52) U.S. Cl. .......... 426/594; 426/103; 426/596
(58) Field of Classification Search ......... 426/594, 426/103
See application file for complete search history.

(56) References Cited

U.S. PATENT DOCUMENTS 3,554,767 A * 1/1971 Daum et al. ............ 426/6
3,968,627 A * 7/1976 Seragnoli ............ 53/370

FOREIGN PATENT DOCUMENTS

WO   WO 95/00038   *   1/1995

OTHER PUBLICATIONS

USDA Database. Coffee, instant, regular, powder. 2010. http://www.nal.usda.gov/fnic/foodcomp/cgi-bin/list_nut_edit.pl.*
USDA Database. Milk, dry, nonfat, regular. 2010. http://www.nal.usda.gov/fnic/foodcomp/cgi-bin/list_nut_edit.p.*

* cited by examiner

*Primary Examiner* — Anthony Weier
(74) *Attorney, Agent, or Firm* — S McPherson IP Law

(57) ABSTRACT

Traditionally, coffee would be prepared in one of the four basic recipes; black, with sugar, with cream, or with both sugar and cream to be enjoyed as a beverage drink. It is the object of this invention to bring coffee consumption to a new solid foundation so that one can have his/her coffee and eat it too in a delicious and chewy recipe that contains all the ingredients and flavorings that coffee drinkers love but without the hot water.

19 Claims, 1 Drawing Sheet

Flavorful Waterless Coffee

*Typical size at 10 grams is equivalent to a 6 oz. cup of regular coffee*

*1/2" diameter by 1.5" long*

Flavorful Waterless Coffee
Typical size at 10 grams is equivalent to a 6 oz. cup of regular coffee
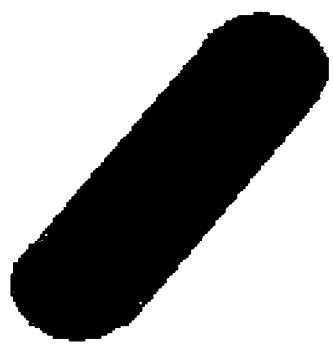 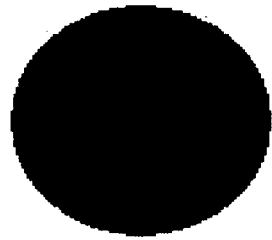
1/2" diameter by 1.5" long          1" diameter ball
Figure 1                                   Figure 2

FLAVORFUL WATERLESS COFFEE

BACKGROUND OF THE INVENTION

Basing from my own experience, having to drive from San Diego to Los Angeles Calif. and back (roughly 300 mile round trip) two to three times a month while I was putting my children to college at UCLA was a very challenging driving experience. I had to make pit stops for coffee break several times along the way just to keep myself alert and awake. That alone plus the usual heavy traffic congestions adds a lot on travel time. So I said to myself, "there must be a better way to keep myself awake, energized, and alert while driving"—and this idea to satisfy a long-felt need was conceived. With some waterless coffee in my pocket, I can now drive over extended period without having to make pit stops for coffee break. I am sure that I am not alone to benefit from this invention.

SUMMARY OF THE INVENTION

It is the object of this invention to present a waterless version of the traditional instant coffee in a most versatile delicious format similar to a candy. The versatility of this invention will enable coffee lovers to enjoy their coffee anytime, anywhere; whether, jogging, walking, playing, working, driving a car, piloting an airplane, operating a heavy machinery, or floating inside a space station, without the danger of accidental scalding by hot water. Whenever one needs that instant caffeine boost for pep and energy, this long-felt needed invention will definitely come in handy. Furthermore, this waterless coffee can last up to a year or more.

However, keep in mind that this invention is NOT A COFFEE-FLAVORED CANDY and it is not for kids. It contains caffeine and can be habit forming like regular caffeinated coffee.

BRIEF DESCRIPTION OF THE DRAWING

The present invention will be better understood by the following detailed description of some preferred embodiment of the invention, taken in conjunction with the accompanying drawings. FIG. 1 and FIG. 2 are perspective views of this flavorful waterless coffee according to the first embodiment of the invention. Only two drawings are presented because this invention will do well in any shape or form desired, limited only by the makers imagination. Each 10-gram piece of this waterless coffee is equivalent to a 6-ounce cup of traditionally prepared instant coffee.

DESCRIPTION OF THE PREFERRED EMBODIMENT

FIG. 1, and FIG. 2 are perspective illustration of a 10-gram piece of this invention that equates to a 6 oz. cup of coffee brewed traditionally when prepared using this formula: 1 tsp of instant coffee granules, 2 tsp of dry coffee creamer, 2 grams of dry artificial sweetener, and enough water or flavor enhancing liquid solution that will act as binding agent for the dry ingredients in order to achieve the desired texture and flavor.

The dry ingredients must be mixed thoroughly while still dry. Then a proportional amount of water or liquid flavoring solution comprising vanilla, or hazelnut is added for binding the dry ingredients to a dough-like composition. The quantity of binding agent to be added depends on the desired texture and flavor of the finished product and therefore must be controlled by the maker during the mixing process. Small quantities of this invention can be made manually by rolling the mixed ingredients on a flat surface and then cut to the desired shape and size. For large quantities, a power mixer and extrusion machine are necessary.

Although some preferred embodiments of the invention have been described above by way of example only, it will be understood by those skilled in the field that modifications may be made to the disclosed embodiments without departing from the scope of the invention, which is defined by the appended claims.

I claim:

1. A flavorful waterless coffee snack consisting essentially of three dry ingredients and enough water or enough flavor enhancing solution comprising vanilla essence or hazel nut essence for binding the dry ingredients to achieve a desired flavor and texture, said three dry ingredients being instant coffee granules, sweetener, and coffee creamer; wherein the texture of said flavorful waterless coffee snack is solid and chewy and in eating form rather than liquid in drinking form and is suitable for manual shaping, molding, or extrusion into a size and shape that is eaten; and where each 10-gram piece of said flavorful waterless snack is the ingredient equivalent of a 6 oz. cup of conventionally brewed instant coffee without the amount of hot water present in a conventionally brewed instant coffee by using the following formula for the three dry ingredients: 1 tsp of instant coffee granules, 2 tsp of dry coffee creamer, and 2 grams of sweetener.

2. The flavorful waterless coffee as recited in claim 1, wherein the sweetener comprises natural sugar.

3. The flavorful waterless coffee as recited in claim 1, wherein the sweetener comprises natural honey.

4. The flavorful waterless coffee as recited in claim 1, wherein the creamer comprises dry powder milk.

5. The flavorful waterless coffee as recited in claim 1, wherein the creamer comprises dry non-dairy creamer.

6. The flavorful waterless coffee as recited in claim 1, wherein the coffee granules is decaffeinated.

7. The flavorful waterless coffee as recited in claim 1, wherein the form and size of a finished product comprises various sizes and shape depending on the maker's choice.

8. The flavorful waterless coffee as recited in claim 1, wherein it is wrapped individually using wrappers comprising of wax paper and aluminum foil in combination or used individually.

9. The flavorful waterless coffee as recited in claim 1, wherein surface coating comprising sugar with various coloring is applied for flavor enhancement and appearance.

10. The flavorful waterless coffee as recited in claim 1, wherein the product is pasteurized.

11. A chewable snack which is an ingredient equivalent of a liquid cup of instant coffee without the hot water consisting essentially of instant coffee granules, sweetener, and coffee creamer, as dry ingrediets, which are mixed with enough water or enough flavor enhancing liquid solution comprising vanilla essence or hazel nut essence for binding the dry ingredients to achieve a desired flavor and texture; wherein the texture is solid and in eating form rather than liquid in drinking form, and is suitable for manual shaping, molding, or extrusion into a size and shape that is eaten; wherein each 10-gram piece of the chewy snack is the ingredient equivalent of a 6 oz. liquid cup of instant coffee without the amount of hot water present in a conventionally brewed instant coffee by when using the following formula for the three dry ingredient: 1 tsp of instant coffee granules, 2 tsp of dry coffee creamer, and 2grams of sweetener.

12. The chewable snack as recited in claim 11, wherein the sweetener comprises natural sugar.

13. The chewable snack as recited in claim 11, wherein the sweetener comprises natural honey.

14. The chewable snack as recited in claim 11, wherein the creamer comprises dry powder milk.

15. The chewable snack as recited in claim 11, wherein the creamer comprises dry non-dairy creamer.

16. The chewable snack as recited in claim 11, wherein the coffee granules are decaffeinated.

17. The chewable snack as recited in claim 11, wherein it is wrapped individually using wrappers comprising of wax paper and aluminum foil in combination or used individually.

18. The chewable snack as recited in claim 11, wherein surface coating comprising sugar with various coloring is applied for flavor enhancement and appearance.

19. The chewable snack as recited in claim 11, wherein the product is pasteurized.

* * * * *